United States Patent
Adcock et al.

(10) Patent No.: US 12,081,555 B2
(45) Date of Patent: Sep. 3, 2024

(54) ACCESS CONTROL SYSTEMS AND METHODS FOR AUTOMATICALLY ASSIGNING ROLES

(71) Applicant: Capital One Services, LLC, McLean, VA (US)

(72) Inventors: Lee Adcock, Midlothian, VA (US); Christopher Camenares, Watertown, MA (US); Nahid Farhady Ghalaty, San Diego, CA (US); Vincent Pham, Seattle, WA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 264 days.

(21) Appl. No.: 17/545,338

(22) Filed: Dec. 8, 2021

(65) Prior Publication Data
US 2023/0179604 A1  Jun. 8, 2023

(51) Int. Cl.
*H04L 9/40*  (2022.01)
(52) U.S. Cl.
CPC .......... *H04L 63/105* (2013.01); *H04L 63/101* (2013.01); *H04L 63/102* (2013.01); *H04L 63/104* (2013.01)
(58) Field of Classification Search
CPC ... H04L 63/105; H04L 63/101; H04L 63/102; H04L 63/104
See application file for complete search history.

(56) References Cited

U.S. PATENT DOCUMENTS

| | | | |
|---|---|---|---|
| 9,491,200 B2 | 11/2016 | Mardikar et al. | |
| 9,684,793 B2 | 6/2017 | Schlesinger et al. | |
| 9,860,254 B2 | 1/2018 | Smith | |
| 10,419,954 B1 * | 9/2019 | Konstantakopoulos | H04W 16/18 |
| 10,482,268 B1 | 11/2019 | Osborne et al. | |

(Continued)

OTHER PUBLICATIONS

Dao-jun Han et al, Permission and role automatic assigning of user in role-based access control, 2012, Central South University Press and Springer-Verlag Berlin Heidelberg (Year: 2012).*

(Continued)

*Primary Examiner* — Javier O Guzman
(74) *Attorney, Agent, or Firm* — TROUTMAN PEPPER HAMILTON SANDERS LLP; Christopher J. Forstner; John A. Morrissett

(57) ABSTRACT

A system including: one or more processors; a memory storing instructions that, when executed by the one or more processors are configured to cause the system to receive user profile data for a plurality of users and user activity data associated with each user. The system may generate user access data based on the user profile data and user activity data. The system may generate a plurality of clusters including one or more users. The system may identify an access control permission that is common to a predetermined number of users within a cluster. The system may identify a user within the cluster that lacks the access control permission. The system may calculate a similarity measurement between the user access data of the user and the predetermined number of users. The system may automatically grant the access control permission in response to the similarity measurement exceeding a predetermined threshold.

20 Claims, 7 Drawing Sheets

(56) References Cited

U.S. PATENT DOCUMENTS

| | | | |
|---|---|---|---|
| 10,757,116 B2 | 8/2020 | Ardeli et al. | |
| 10,785,167 B2 | 9/2020 | Karame et al. | |
| 10,878,079 B2* | 12/2020 | Vepa | G06F 21/335 |
| 11,525,279 B2* | 12/2022 | Wennberg | E05B 13/005 |
| 11,528,279 B1* | 12/2022 | Armada | H04L 63/104 |
| 11,924,220 B2* | 3/2024 | Armada | H04L 63/20 |
| 2005/0055573 A1* | 3/2005 | Smith | G06F 21/6218 |
| | | | 726/4 |
| 2012/0246098 A1 | 9/2012 | Chari et al. | |
| 2012/0271854 A1* | 10/2012 | Truong | G06F 21/41 |
| | | | 707/E17.005 |
| 2013/0111583 A1 | 5/2013 | Hernandez et al. | |
| 2014/0196104 A1* | 7/2014 | Chari | H04L 63/102 |
| | | | 726/1 |
| 2014/0317019 A1* | 10/2014 | Papenbrock | G06Q 40/06 |
| | | | 705/36 R |
| 2017/0270180 A1* | 9/2017 | State | G06F 40/169 |
| 2019/0075122 A1* | 3/2019 | Ardeli | H04L 63/101 |
| 2019/0097871 A1* | 3/2019 | Tee | H04L 41/065 |
| 2019/0098033 A1* | 3/2019 | Christian | G06N 20/00 |
| 2020/0252405 A1* | 8/2020 | Sankavaram | G06F 21/62 |
| 2021/0174305 A1* | 6/2021 | Schornack | G06F 16/285 |
| 2021/0266323 A1* | 8/2021 | Jani | G06N 20/00 |

OTHER PUBLICATIONS

Role-based access control (Year: 2012).*

* cited by examiner

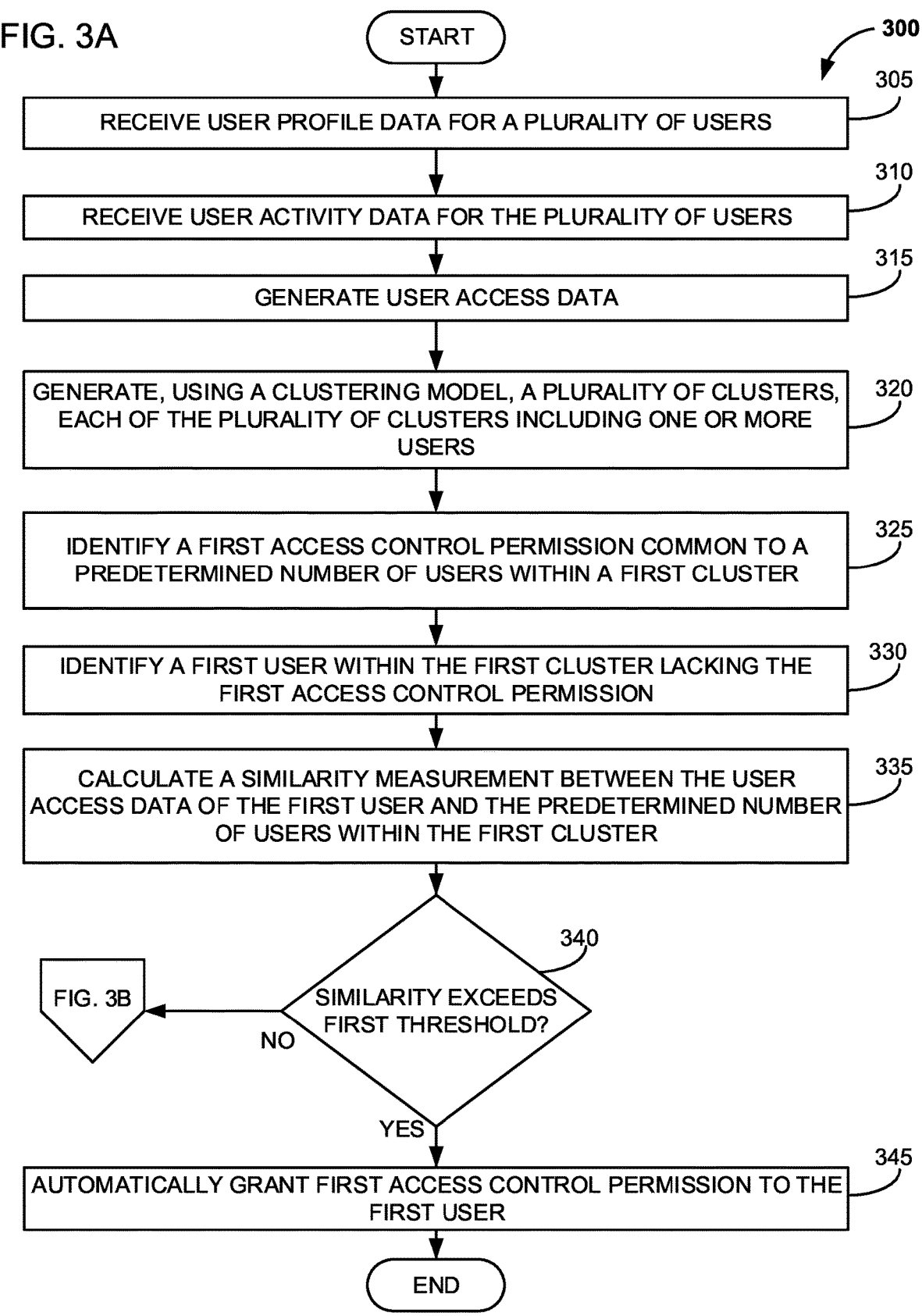

ACCESS CONTROL SYSTEMS AND METHODS FOR AUTOMATICALLY ASSIGNING ROLES

FIELD

The disclosed technology generally relates to managing role based access control, and more particularly access control systems and methods for automatically assigning access control roles to users based on a clustering model.

BACKGROUND

The modern workplace requires workers to utilize a large number of technologies to facilitate the efficient production of new products and services. For example, organizations utilize a number of software and hardware resources that include software products, cloud computing services, local server applications, data management tools, data visualization programs, etc. Individual users may be assigned access rights (or access roles) to one or more of these resources depending on the needs of the individual user to perform his or her function within the organization. Organizations face a significant challenge in manually assigning the appropriate roles to all users.

One challenge organizations face in the assignment of roles is onboarding new users within the organization. It is difficult and time consuming to assign all the necessary access roles to a new user within an organization. It becomes increasingly difficult to assign necessary roles to new users particularly in light of the increased trend of cross-collaboration among separate teams within an organization, for example when team members (e.g., users) from one department of an organization collaborate with team members of another department. Manually assigning the correct access roles to users within such an organization is challenging.

Traditional access management methods rely heavily on a hierarchy of role reviewers within the organization that manually review and provide approval to assign certain roles to users based on the needs of the organization. For example, individuals who belong to the same department, or organizational unit, are assigning similar roles or that give these users similar access rights. However, with the increase of cross-collaboration, it is no longer the case that team members within a respective organizational unit will have the same access roles granting similar access rights to resources available to the organization.

Accordingly, there is a need for systems and methods capable of algorithmic assignment of role based access control to resources available within an organization based on clustering users within an organization based on similar users profiles.

The disclosed embodiments are directed to these and other considerations.

SUMMARY

Certain disclosed embodiments provide systems and methods for algorithmic assignment of role based access control. The system may include one or more processors and a memory storing instructions, that when executed by the one or more processors are configured to cause the system to perform the steps of a method. The method may include receiving user profile data for a plurality of users. The profile data can include one or more user access controls granted to each user. The method may include receiving user activity data associated with each user. The method may include generating user access data based on a combination of the user profile data and the user activity data. The method may include generating, user a clustering model, a plurality of clusters. Each of the plurality of clusters can include one or more users of the plurality of users. The one or more users of a respective cluster may have a first degree of similarity that is higher than a second degree of similarity between users outside of the respective cluster. The method may include identifying a first user access control permission common to a predetermined number of users within a first cluster of the plurality of clusters. The method can include identifying a first user within the first cluster lacking the first access control permission (e.g., access to a particular database, access to a particular application, access to restricted information, etc.). The method can include calculating a similarity measurement between the user access data of the first user and the predetermined number of users within the first cluster. The method can include, in response to the similarity measurement exceeding a first predetermined threshold, automatically granting the first access control permission to the first user.

In another aspect, a computer-implemented method for algorithmic assignment of role based access control is disclosed. The method may include receiving user profile data for a plurality of users. The user profile data can include one or more user access control permission granted to each user. The method can include receiving user activity data associated with each user of the plurality of users. The method can include generating user access data based on a combination of the user profile data and the user activity data. The method can include generating, using a k-means clustering model, a plurality of clusters, each of the plurality of clusters including one or more users of the plurality of users. The one or more users within a respective cluster can have a first degree of similarity that is higher than a second degree of similarity between users outside of the respective cluster. The first degree of similarity can be determined based on minimizing a within-cluster sum of squares. The method can include identifying a first access control permission common to a predetermined number of users within a first cluster of the plurality of clusters. The method can include identifying a first user within the first cluster lacking the first access control permission. The method can include calculating a similarity measurement between the first user access data of the first user and the predetermined number of users within the first cluster. The method can include, in response to the similarity measurement exceeding a first predetermined threshold, automatically granting the first access control permission to the first user.

In another aspect, a non-transitory computer readable medium is disclosed. The medium can store instructions that are executable by one or more processors to cause the one or more processors to perform steps of a method. The method can include receiving user profile data for a plurality of users. The user profile data can include one or more users access control permissions granted to each user of the plurality of users. The method can include receiving user activity data associated with each user. The method can include generating user access data based on a combination of the user profile data and the user activity data. The method can include generating, using a clustering model, a plurality of clusters. Each of the plurality of clusters may include one or more users of the plurality of users. The one or more users within a respective cluster can have a first degree of similarity that is higher than a second degree of similarity between users outside of the respective cluster. The method can include identifying a first access control permission that is common to a predetermined number of users within a first cluster of the plurality of clusters. The method can include identifying a first user within the first cluster that lacks the first access control permission. The method can include calculating a similarity measurement between the first user access data of the first user and the predetermined number of users within the first cluster. In response to the similarity measurement exceeding a first predetermined threshold, the method can include automatically granting the first access control permission to the first user. In response to the similarity measurement exceeding a second predetermined threshold, the method can include automatically granting the first access control permission to the first user and generating and transmitting a notification to a role authorizer that is associated with the first user access control permission. In response to the similarity measurement exceeding a third predetermined threshold, the method can include reducing a number of manual authorizations required before granting the first access control permission to the first user.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 3A is a flowchart of a method of automatically granting a first access control permission to a first user, according to an example embodiment;

DETAILED DESCRIPTION

Figure 1:
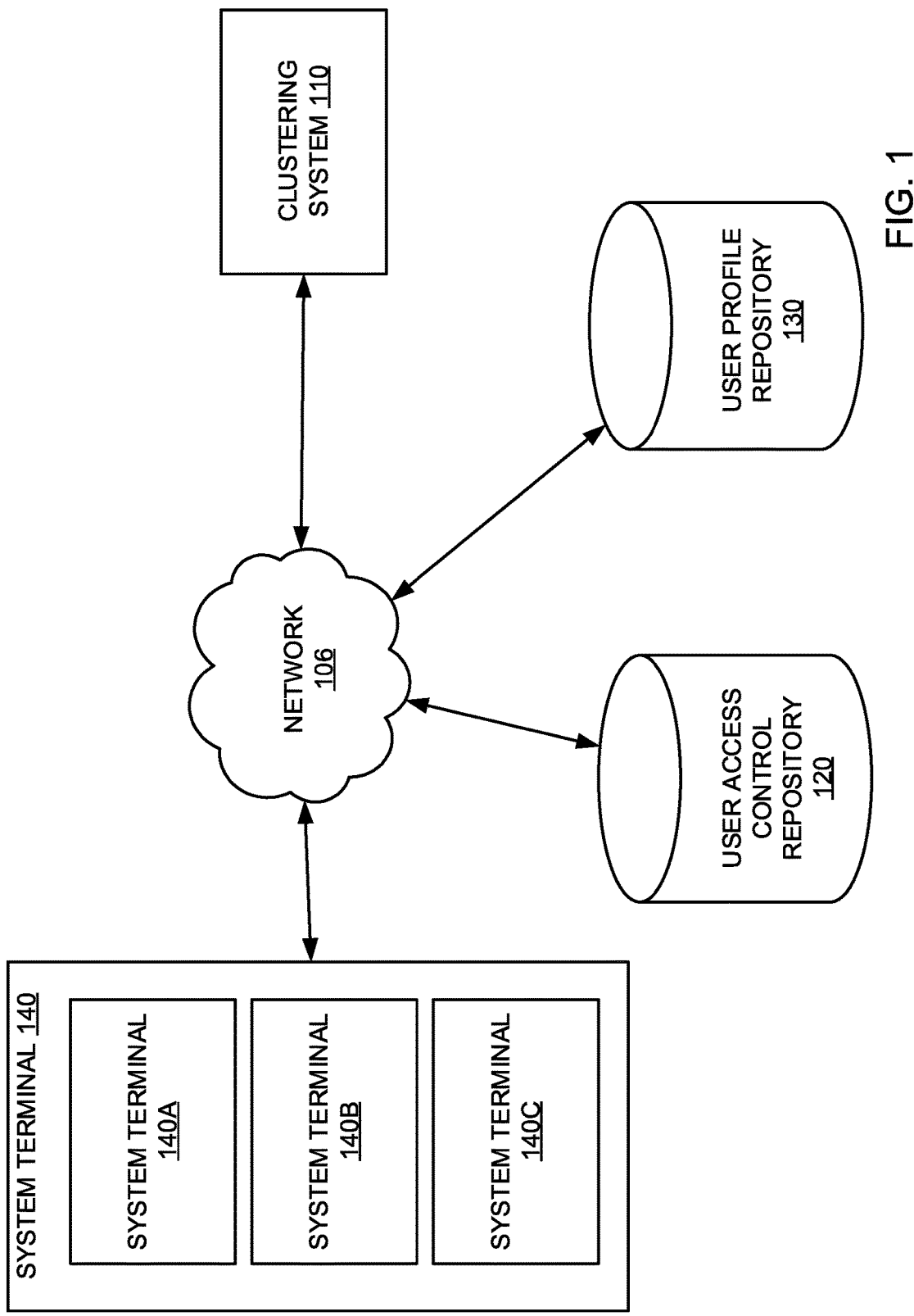
FIG. 1 is a diagram of an example system environment that may be used to implement one or more embodiments of the present disclosure.

Examples of the present disclosure generally include systems and methods for algorithmic assignment of role based access control. The systems and methods are capable of clustering users, using a clustering model, within an organization based on user access data, which can be based on user profile data and user access data. The systems and methods are capable of identifying a first access control permission common to a predetermined number of users within a first cluster of a plurality of clusters, as well as identify a first user within the first cluster that lacks the first access control permission. The system may calculate a similarity measurement between the users access data of the first user and the user access date of the predetermined number of users within the first cluster. The system can automatically assign a first access control permission to the first user based on the similarity measurement exceeding a predetermined threshold, which can significantly decrease the costs associated with traditional role based access management systems.

The systems and methods described herein are necessarily rooted in computer technology as they relate to improving the functioning of role based access management systems. Prior role based access management systems required continuous manual intervention to determine which roles to assign to users within an organization. Additionally, prior role based access management systems had difficulty with determining which access rights to assign to new users given the growth of cross-collaboration among different organizational units within a respective organization. In some instances, the system utilizes clustering models to aggregate the data, reduce and filter the data, and generate a plurality of clusters of users based on the data. Clustering models are a unique computer technology that involve clustering users together based on maximizing the similarity between user profile vectors of users within a respective cluster, unlike current methods which require manual categorization of users into groups and assigning role based access based on the manual categorization.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example embodiments of the disclosed technology, examples of which are illustrated in the accompanying drawings and disclosed herein. Wherever convenient, the same reference numbers will be used throughout the drawings to refer to the same or like parts.

In accordance with certain disclosed embodiments, system environment 100 may include a clustering system 110 in communication with a system terminal 140, user access control repository 120, and user profile repository 130 over a network 106. Clustering system may be a computing device, such as a mobile computing device (e.g., a smart phone, tablet computer, smart wearable device, portable laptop computer, voice command device, wearable augmented reality device, or other mobile computing device or fixed computing device (e.g., a desktop computer or server). An example architecture that may be used to implement one or more aspects of system 100 is described below with reference to FIG. 2.

Clustering system 110 may receive user profile data (e.g., from user profile repository 130) and user access data (e.g., from user access control repository 120) and can be configured to generate user access data based on a combination of the user profile data and the user activity data. The clustering system 110 may include a clustering model that is capable of clustering users of the system into clusters based on users within a respective cluster having a higher degree of similarity than a degree of similarity of users that are not within the respective cluster. Clustering system 110 may be configured to implement one of a variety of clustering models, for example, a k-means clustering model or a density-based spatial clustering of applications with noise clustering model (DBSCAN). Clustering system 110 may also be in communication with a system terminal (e.g., system terminal 140), and may intermittently send notifications to the system terminal regarding requiring a manual authorization for a user access permission to be granted to a user of the system, and/or reducing the number of manual authorizations required before granting a user access permission to a user of the system.

User access control repository 120 may store user access permissions granted to users within the system. For example, the system may include a plurality of users of an organization that each are granted numerous access permissions based on their roles within the organization. User access control repository may be configured to store records of each user and each access control permissions granted to each user. According to some embodiments, clustering system 110 may use the information stored on user access control repository 120 to generate user access data and a plurality of clusters.

User profile repository 130 may store user profile data for users within the system. For example, the system may include a plurality of users of an organization that each have associated profile data. Profile data may be collected from a system terminal (e.g., system terminal 140A, 140B, 140C, etc.) associated with a respective user. Profile data may include browser activity associated with each user, github commits associated with a respective user, programs installed by on a system terminal 140 associated with a respective user, etc. For example, the system may cluster users based in part on user profile data that is stored on user profile repository 130.

System terminal 140 may consist of a plurality of system terminals (e.g., system terminal 140A, system terminal 140B, system terminal 140C, etc.) Each system terminal 140 may be associated with a respective user within the system 100. For example, user A may be associated with system terminal 140A, user B may be associated with system terminal 140B, user C may be associated with system terminal 140C, and user N may be associated with system terminal 140N. There may be any number of system terminals 140 within the system, depending on the total number of users within the system. According to some embodiments, system terminals 140 may be configured to communicate with clustering system 110 over the network 106. Clustering system 110 may determine a plurality of clusters and automatically add one or more user access control permissions to a respective user based on the access control being granted to other users within the same cluster as the respective user (e.g., by updating user access control repository 120). According to some embodiments, if the similarity of user access data between the respective user and other users within the same cluster is beyond a first threshold, the system may automatically grant the user access control permission to the respective user. If the similarity of user access data between the respective user and other users within the same cluster is beyond a second threshold, the system may automatically grant the user access control permission and additionally generate a notification to a system terminal 140 associated with a role authorizer that is responsible for manually granting the user access control permission. For example, the role authorizer may be a manager or team leader within the organization associated with the system. If the similarity of user access between the respective user and other users within the same cluster is beyond a third threshold, the system may reduce a number of manual authorizations required before the access control permission is granted to the respective user.

Network 106 may be of any suitable type, including individual connections via the internet such as cellular or Wi-Fi networks. In some embodiments, network 106 may connect terminals using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. One of ordinary skill will recognize that various changes and modifications may be made to system environment 100 while remaining within the scope of the present disclosure. For example, in some cases, user access control repository 120 and/or user profile repository may be implemented in "serverless" forms (e.g., executed within clustering system 110). Moreover, while the various components have been discussed as distinct elements, this is merely an example, and, in some cases, various elements may be combined into one or more physical or logical systems.

Figure 2:
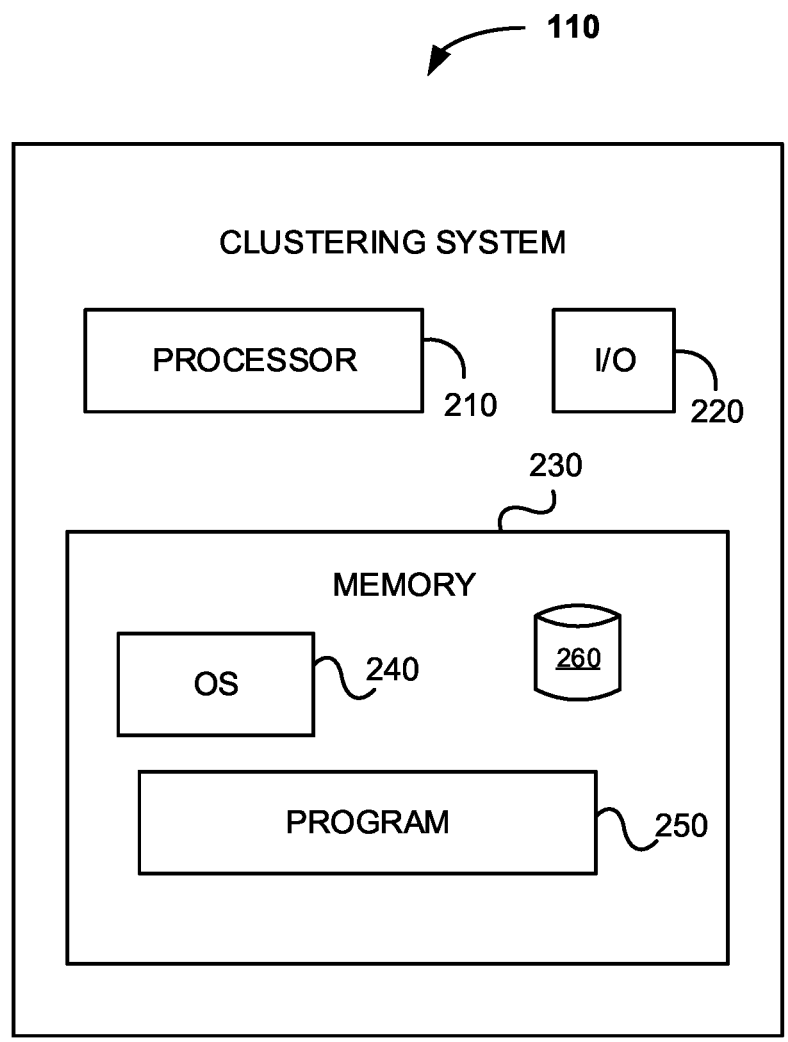
FIG. 2 is a block diagram of a clustering system, according to an example embodiment.

FIG. 2 is a block diagram (with additional details) of the clustering system 110, as also depicted in FIG. 1. According to some embodiments, system terminal 140, user access control repository 120, and/or user profile repository 130, as depicted in FIG. 1, may have a similar structure and components that are similar to those described with respect to clustering system shown in FIG. 2. As shown, the clustering system 110 may include a processor 210, an input/output ("I/O") device 220, a memory 230 containing an operating system ("OS") 240 and a program 250. In certain example implementations, the clustering system 110 may be a single server or may be configured as a distributed computer system including multiple servers or computers that interoperate to perform one or more of the processes and functionalities associated with the disclosed embodiments. In some embodiments, the clustering system 110 may further include a peripheral interface, a transceiver, a mobile network interface in communication with the processor 210, a bus configured to facilitate communication between the various components of the clustering system 110, and a power source configured to power one or more components of the clustering system 110.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the clustering system 110 may include one or more storage devices configured to store information used by the processor 210 (or other components) to perform certain functions related to the disclosed embodiments. In one example, the clustering system 110 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the clustering system 110 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the clustering system 110 may include the memory 230 that may include one or more programs 250 to perform one or more functions of the disclosed embodiments. For example, in some embodiments, the clustering system 110 may cluster one or more users of the plurality of users into a respective cluster using a clustering model via a program 250.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the clustering system 110 to perform one or more of the processes and functionalities associated with the disclosed embodiments.

Database 260 may include stored data related to user profile data and/or user activity data that is typically stored on user access control repository 120 and user profile repository, respectively. According to some embodiments, database 260 may additionally store data to enable the clustering system to implement a clustering model, in accordance with embodiments consistent with the present disclosure.

The clustering system 110 may also be communicatively connected to one or more memory devices (e.g., databases) locally or through a network. The remote memory devices may be configured to store information and may be accessed and/or managed by the clustering system 110. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The clustering system 110 may also include one or more I/O devices 220 that may comprise one or more interfaces for receiving signals or input from devices and providing signals or output to one or more devices that allow data to be received and/or transmitted by the clustering system 110. For example, the clustering system 110 may include interface components, which may provide interfaces to one or more input devices, such as one or more keyboards, mouse devices, touch screens, track pads, trackballs, scroll wheels, digital cameras, microphones, sensors, and the like, that enable the clustering system 110 to perform aspects consistent with the disclosure.

In example embodiments of the disclosed technology, the clustering system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the clustering system 110 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the clustering system 110 may include a greater or lesser number of components than those illustrated.

FIG. 3A is a flowchart 300 of a method of automatically granting a first access control permission to a first user, according to an example embodiment. Referring to FIG. 3A, in block 305, the method may include receiving user profile data for a plurality of users. For example, user profile data may include one or more access control permissions currently granted to each user of the plurality of users operating within the system 100 environment. Each user access control permission may be used to grant a respective user access to a resource within system 100. For example, resources can include access to one or more virtual machines implemented in a cloud environment, local access to certain databases (e.g., read-only access and/or overwrite access), access to certain programs, both locally implemented or implemented in the cloud, access to private webpages, etc. User profile data may also include organizational data for the user, such as the role of the user within the organization (e.g., role authorizer).

In block 310, the method may include receiving user activity data associated with each user. For example, user activity data may be determined by querying a respective system terminal 140 (e.g., system terminal 140A, system terminal 140B, system terminal 140C, etc.) for user activity data associated with respective users, for example, user A, user B, user C, etc. User activity data can include browser history data, github commits, and the like.

In block 315, the system (e.g., clustering system 110) may generate user access data. For example, user access data may be a combination of the user profile data received from user access control repository 120 and user activity data received from user profile repository 130. According to some embodiments, generating user access data can further include generating a user access data vector for each user within the system. The user access data vector can include the received user profile data and user activity data for each respective user. For example, the user access data vectors generated for each user can include a plurality of data entries each associated with the user activity data and the user profile data for each user. According to some embodiments, user profile data can be represented in vectorized form by including a "1" entry for every user access permission granted to a respective user and a "0" entry for every user access permission that is not granted to a respective user. In some embodiments, user activity data may similarly be represented with a "1" entry provided for every feature associated with a respective user profile and a "0" entry provided for every feature not associated with a respective user profile. For example, if user A has committed code to github for Project A, user A's user access data vector may have an entry of "1" under the variable "github Project A." According to other embodiments, instead of converting the user profile data into binary values, the system may perform clustering directly on a mix of numeric and non-numeric data using clustering algorithms known in the art.

In block 320, the system (e.g., clustering system 110) may generate, using a clustering model, a plurality of clusters. Each of the plurality of generated clusters may include one or more users who are clustered based on maximizing the similarity of user access data of each user within a respective cluster, and minimizing the similarity of user access data of any given user within the respective cluster with respect to any given user outside of the respective cluster. According to some embodiments, the clustering model used by the system can be a k-means clustering model. For example, given a set of real vectors (e.g., user access data vectors), the k-means clustering model may partition the set of real vectors such that the within-cluster sum of squares (i.e., variance) is minimized within a given cluster. The k-means clustering algorithm is represented by Equation (1) as the following minimization problem:

$$\operatorname*{argmin}_{S} \sum_{i=1}^{k} \sum_{x \in S_i} \|x - \mu_i\|^2 = \operatorname*{argmin}_{S} \sum_{i=1}^{k} |S_i| \operatorname{Var} S_i$$

In Equation (1), S can be understood as each set (or cluster), x relates to each user profile data vector, k is the number of clusters, and $\mu_i$ is the mean of points in a given set $S_i$. It can be understood that minimizing the within-cluster sum of squares can be equivalent to maximizing the between-cluster sum of squares. First, a random value of "k" clusters is chosen and "k" centroids are randomly placed within the data set and each vector "x" is assigned to exactly one centroid "k." After the assignment step, the centroids "k" are recalculated based on the vectors "x" assigned to the respective centroid.

According to some embodiments, the system can iteratively continue with assignment and recalculation steps until the assignments of "x" to centroids "k" no longer changes. In some embodiments, the above-described method may be performed for several different values of "k" (e.g., for several different numbers of total cluster groupings) until an optimum number of clusters has been determined. In some embodiments, the optimum number of clusters may be determined based on performing a silhouette analysis. In some embodiments, the optimum number of clusters may be determined based on an elbow curve analysis.

In some embodiments, the clustering model used to generate the plurality of clusters may be a density-based spatial clustering of applications with noise clustering model (DBSCAN). Regardless of the clustering model used, the system (e.g., clustering system 110) can cluster the plurality of users within the system into an optimum number of clusters.

In block 325, the system may identify a first access control permission common to a predetermined number of users within a first cluster. For example, a number of users within a first cluster may have a common first access control permission that gives each user overwrite access to a particular database system employed by an organization associated with system 100.

In block 330, the system may identify a first user within the first cluster that lacks the first access control permission identified in block 325. For example, User A, User B, User C, and User E may all belong to the first cluster and share the first access control permission that grants overwrite access to a database. However, User D may lack the first access control permission that grants overwrite access to the database.

In block 335, the system may calculate a similarity measurement between the user access data of the first user and the predetermined number of users within the first cluster. For example, according to some embodiments, the system may calculate a cosine similarity between the vector "x" associated with the first user and an average vector based on the averaging together the vectors associated with the predetermined number of users within the first cluster.

In decision block 340, the system may determine whether the similarity between the access data of the first user and the predetermined number of users within the first cluster exceeds a first predetermined threshold. In response to the similarity measurement not exceeding the predetermined threshold, the method may move to block 350 (as described with respect to FIG. 3B). In response to the similarity measurement exceeding the first predetermined threshold, the method may move to block 345. According to some embodiments, the similarity measurement can be calculated as a cosine similarity between the first user access data associated with the first user and an average of the user access data associated with the predetermined number of users. In some embodiments, the cosine similarity is determined between a first user access data vector and an average user access data vector determined based on the predetermined number of users.

In block 345, in response to the similarity measurement exceeding the first predetermined threshold, the system may automatically grant the first access control permission to the first user. Accordingly, the system (e.g., clustering system 110) may update the user access control repository 120 to update an entry associated with the first user to reflect that the first user is granted the first access control permission.

Figure 3B:
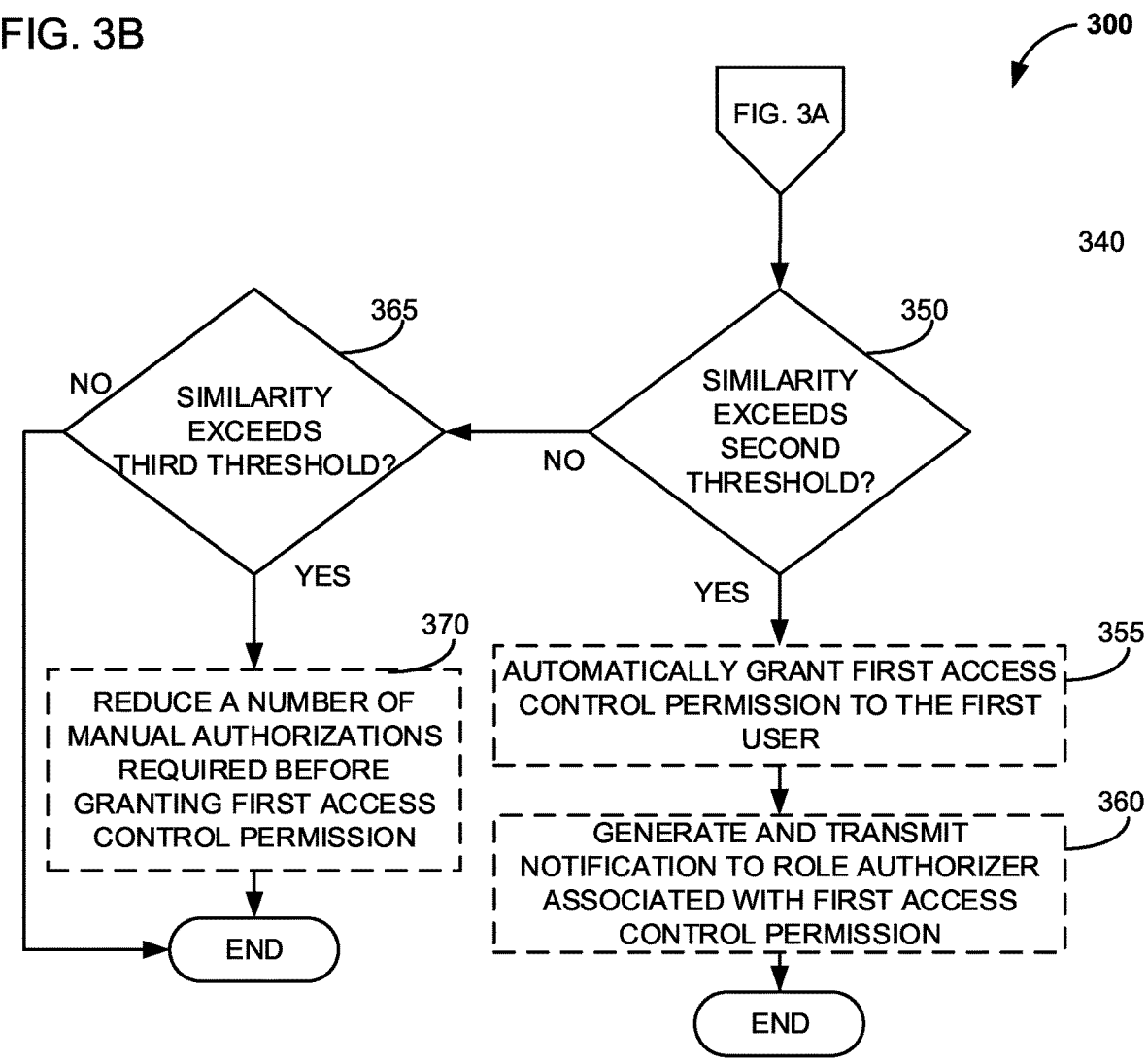
FIG. 3B is a flowchart of a method of reducing a number of authorizations required for a first access control permission, according to an example embodiment.

FIG. 3B is a flowchart of a method of reducing a number of authorizations required for a first access control permission, according to an example embodiment. In decision block 350, the system (e.g., clustering system 110) can determine whether the similarity measurement exceeds a second predetermined threshold. According to some embodiments, the second predetermined threshold has a lower value than the first predetermined threshold. In response to determining that the similarity measurement exceeds the second predetermined threshold, the method may move to block 355. In response to determining that the similarity measurement does not exceed the second predetermined threshold, the method may move to decision block 365.

In block 355, the system may automatically grant the first access control permission to the first user in a similar process as that described with respect to block 345. In block 360, the system may generate and transmit a notification to the role authorizer associated with the first access control permission. For example, the system (e.g., clustering system 110) may generate and transmit a notification to a system terminal 140 associated with the role authorizer responsible for granting the first access control permission. Accordingly, although the system may still automatically grant the first access control permission to the first user when the similarity measurement exceeds the second predetermined threshold, the system may additionally notify the role authorizer that the first access control permission has been given to the first user.

In response to determining that the similarity measurement does not exceed the second predetermined threshold, the method may move to decision block 365. In decision block 365, the system (e.g., clustering system 110) may determine whether the similarity measurement exceeds a third predetermined threshold. According to some embodiments, the third predetermined threshold has a lower value than the second predetermined threshold. In response to determining that the similarity does not exceed the third predetermined threshold, the method may end, and no additional access control permission may be granted to the first user based on the determination.

In response to determining that the similarity measurement exceeds the third predetermined threshold, the method may move to block 370. In block 370, the system may reduce a number of manual authorizations required before the first access control permission is granted to the first user. For example, clustering system 110 may update a record in the user access control repository 120 indicating that the first user will be required to get manual authorization before the first access control is granted. If, typically, the first user would have required manual authorization from role authorizers A, B, and C, the system may change the requirements such that only role authorizers A and B are required to give manual authorization to the first user to grant the first user the relevant first access control permission.

Figure 4:
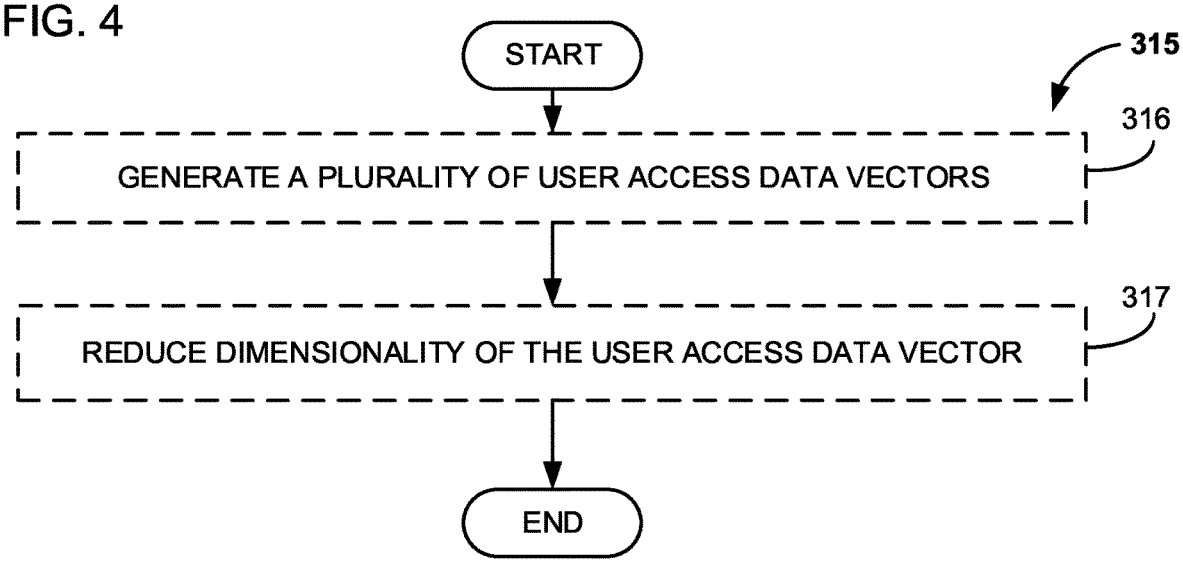
FIG. 4 is a flowchart of a method of generating user access data, according to an example embodiment.

FIG. 4 is a flowchart of a method of generating user access data, according to an example embodiment. In block 316, the system may generate a plurality of user access data vectors. As discussed previously, each user access data vector can include the received user profile data and user activity data for each respective user. For example, the user access data vectors generated for each user can include a plurality of data entries each associated with the user activity data and the user profile data for each user.

In block 317, the system (e.g., clustering system 110) may reduce a dimensionality of the user access data vector. Reducing the dimensionality of the user access data vector may allow the system to discard inputs that do not substantially affect the similarity between users of a given cluster. For example, according to some embodiments, the system may perform principal component analysis in order to reduce the dimensionality of the generated user access data vectors. Reducing the dimensionality of the user access data vectors may reduce the computational complexity and therefore the computational resources and time required to perform the described method, which improves the functionality of the described clustering system. After block 317, method 315 may end.

Figure 5:
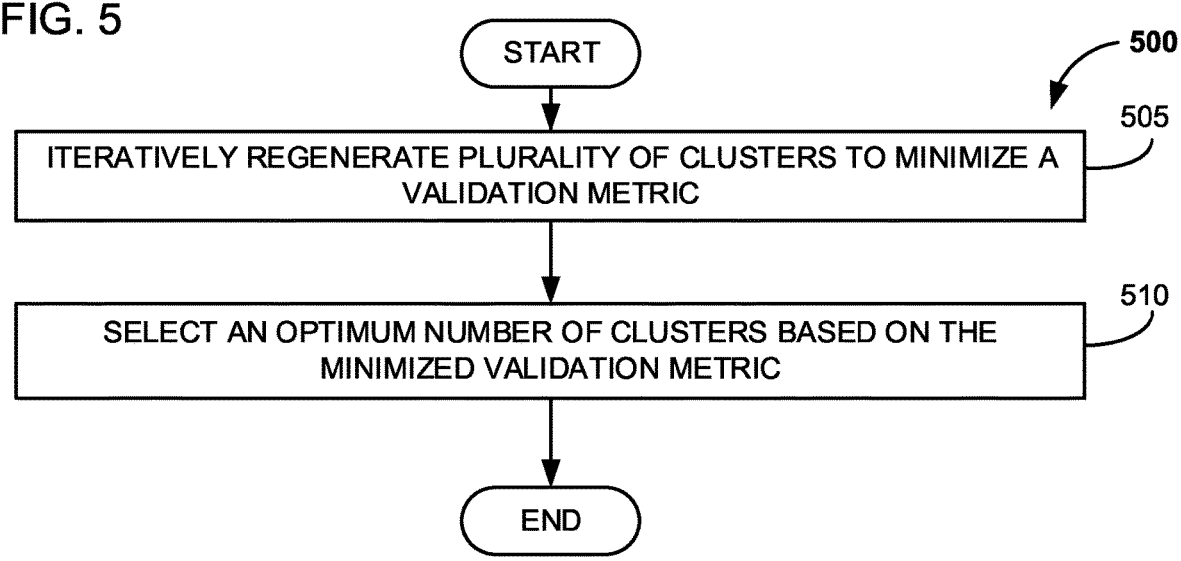
FIG. 5 is a flowchart of a method of selecting an optimum number of clusters, according to an example embodiment.

FIG. 5 is a flowchart of a method of selecting an optimum number of clusters, according to an example embodiment. In step 505 the system (e.g., clustering system 110) may iteratively regenerate a plurality of clusters to minimize a validation metric. For example, the system may try to find an optimal clustering (e.g., by minimizing the value of Equation (1)) with just 2 clusters. Afterwards, the system may attempt the same calculation, but with 3 clusters. The system may continue to iteratively re-generate the plurality of clusters with a different number of clusters until adding additional clusters no longer decreases the variance among users clustered into the same cluster. Accordingly, in block 510, the system may select an optimum number of clusters based on the minimized validation metric. According to some embodiments, the minimized validation metric may be determined based on applying an elbow method of selecting an optimum number of clusters. In other embodiments, the minimized validation metric may be determined based on applying a silhouette method of determining an optimum number of clusters.

Figure 6:
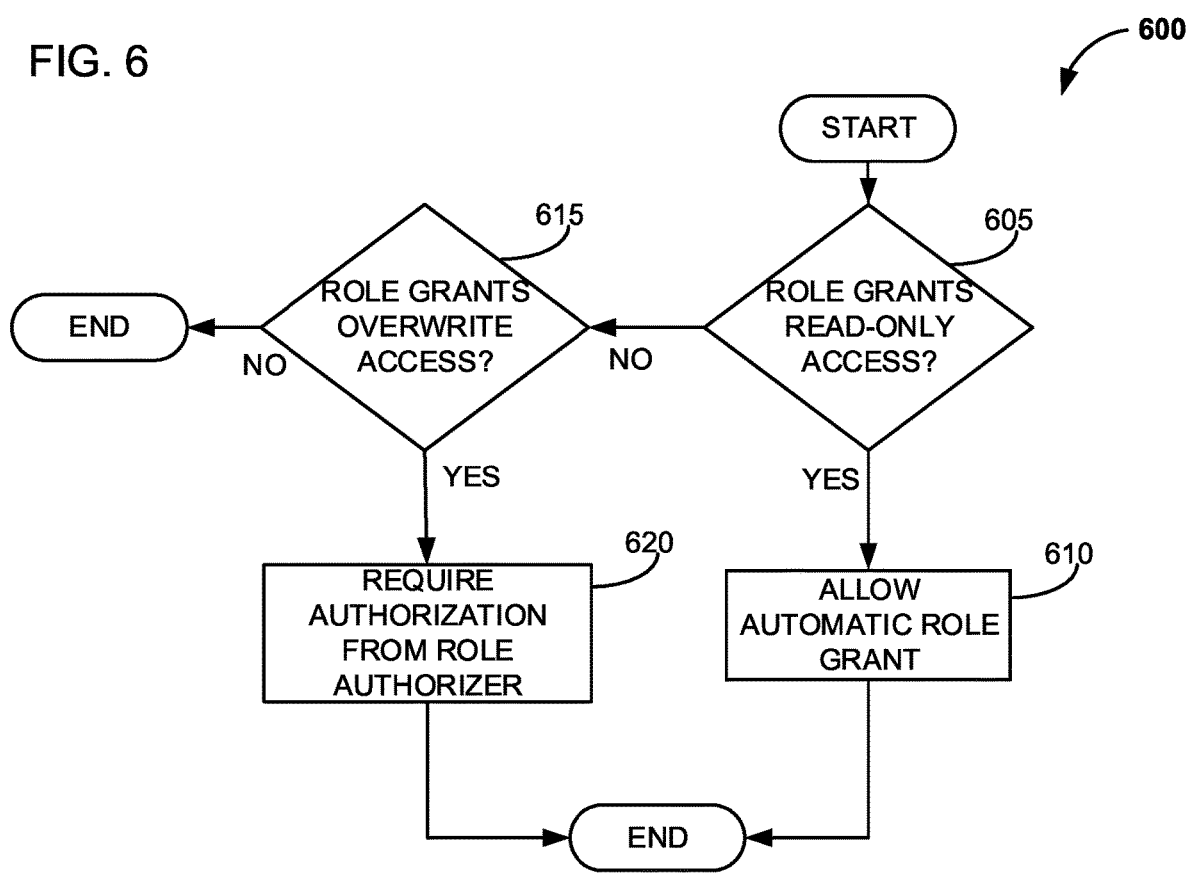
FIG. 6 is a flowchart of a method of determining the sensitivity of an access control permission.

FIG. 6 is a flowchart of a method of determining the sensitivity of an access control permission. In decision block 605, the system may determine whether a respective access control permission being granted to a user grants read-only access. In response to determining that only read-only access is granted, the method may move to block 610, in which the system (e.g., clustering system 110) may allow the automatic grant of the respective access control permission.

In decision block 615, the system may determine whether the role grants overwrite access to one or more resources available under system 100. In response to determining that the respective access control permission grants overwrite access to a resource of system 100, the system may require authorization from a role authorizer in block 620.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASES

The following example use cases describe examples of a use of systems and methods for managing cloud environments. These example use cases are intended solely for explanatory purposes and not for limitation. In one case an organization that has a high rate of cross collaboration may wish to efficiently assign access control permissions to users. Traditional methods of assigning similar roles to users within a respective group may be ineffective because of the high level of cross-collaboration among groups within the organization. Accordingly, the organization may employ the clustering system in order to efficiently cluster users by grouping users with similar user access data together in respective clusters. A first user within a respective cluster can be identified that does not include a first access control permission that is common to a predetermined number of other users within the respective cluster. The system may calculate a similarity measurement between the user access data of the first user and the user access data of the other users within the first user's respective cluster. Based on the similarity exceeding a predetermined threshold, the system may automatically grant the first access control permission to first user.

Examples of the present disclosure can be implemented according to at least the following clauses:

Clause 1: A system for algorithmic assignment of role based access control, the system comprising: one or more processors; and a memory storing instructions, that when executed by the one or more processors, are configured to cause the system to: receive user profile data for a plurality of users, the user profile data comprising one or more user access control permissions granted to each user of the plurality of users; receive user activity data associated with each user; generate user access data based on a combination of the user profile data and the user activity data; generate, using a clustering model, a plurality of clusters, each of the plurality of clusters comprising one or more users of the plurality of users, wherein the one or more users within a respective cluster have a first degree of similarity higher than a second degree of similarity between users outside of the respective cluster; identify a first access control permission common to a predetermined number of users within a first cluster of the plurality of clusters; identify a first user within the first cluster lacking the first access control permission; calculate a similarity measurement between the user access data of the first user and the predetermined number of users within the first cluster; responsive to the similarity measurement exceeding a first predetermined threshold, automatically grant the first access control permission to the first user.

Clause 2: The system of clause 1, wherein the memory stores instructions, that when executed by the one or more processors cause the system to: responsive to the similarity measurement exceeding a second predetermined threshold, automatically grant the first access control permission to the first user; generate and transmit a notification to a role authorizer associated with the first access control permission.

Clause 3: The system of clause 1, wherein the memory stores instructions, that when executed by the one or more processors cause the system to: responsive to the similarity measurement exceeding a third predetermined threshold, reducing a number of manual authorizations required before granting the first access control permission to the first user.

Clause 4: The system of clause 1, wherein the memory stores instructions, that when executed by the one or more processors cause the system to: generate the plurality of clusters using a k-means clustering model; and determine the first degree of similarity based on minimizing a within-cluster sum of squares.

Clause 5: The system of clause 4, wherein the memory stores instructions, that when executed by the one or more processors cause the system to: iteratively regenerate the plurality of clusters to minimize a validation metric; and select an optimum number of clusters k based on the minimized validation metric.

Clause 6: The system of clause 5, wherein the validation metric is determined by a method selected from a silhouette analysis and an elbow curve analysis.

Clause 7: The system of clause 1, wherein the memory stores instructions, that when executed by the one or more processors cause the system to: generate the plurality of clusters using a density-based spatial clustering of applications with noise clustering model.

Clause 8: The system of clause 1, wherein generating user access data comprises generating a plurality of user access data vectors, each of the plurality of user access data vectors based on the combination of user profile data and user activity data.

Clause 9: The system of clause 8, wherein generating the plurality of clusters further comprises reducing a dimensionality of the user access data vector.

Clause 10: The system of clause 1, wherein the similarity measurement comprises a cosine similarity between a first user access data vector associated with the first user and an average user access data vector associated with the predetermined number of users.

Clause 11: A computer-implemented method for algorithmic assignment of role based access control, the method comprising: receiving user profile data for a plurality of users, the user profile data comprising one or more user access control permissions granted to each user of the plurality of users; receiving user activity data associated with each user; generating user access data based on a combination of the user profile data and the user activity data; generating, using a k-means clustering model, a plurality of clusters, each of the plurality of clusters comprising one or more users of the plurality of users, wherein the one or more users within a respective cluster have a first degree of similarity higher than a second degree of similarity between users outside of the respective cluster, the first degree of similarity determined based on minimizing a within-cluster sum of squares; identifying a first access control permission common to a predetermined number of users within a first cluster of the plurality of clusters; identifying a first user within the first cluster lacking the first access control permission; calculating a similarity measurement between the user access data of the first user and the predetermined number of users within the first cluster; responsive to the similarity measurement exceeding a first predetermined threshold, automatically granting the first access control permission to the first user.

Clause 12: The method of clause 11, further comprising: responsive to the similarity measurement exceeding a second predetermined threshold, automatically granting the first access control permission to the first user; generating and transmitting a notification to a role authorizer associated with the first access control permission.

Clause 13: The method of clause 11, further comprising: responsive to the similarity measurement exceeding a third predetermined threshold, reducing a number of manual authorizations required before granting the first access control permission to the first user.

Clause 14: The method of clause 11, further comprising: iteratively regenerating the plurality of clusters to minimize a validation metric; and selecting an optimum number of clusters k based on the minimized validation metric.

Clause 15: The method of clause 14, wherein the validation metric is determined by a method selected from a silhouette analysis and an elbow curve analysis.

Clause 16: The method of clause 11, wherein generating user access data comprises generating a plurality of user access data vectors, each of the plurality of user access data vectors based on the combination of user profile data and user activity data.

Clause 17: The method of clause 16, wherein generating the plurality of clusters further comprises reducing a dimensionality of the user access data vector.

Clause 18: The method of clause 11, wherein the similarity measurement comprises a cosine similarity between a first user access data vector associated with the first user and an average user access data vector associated with the predetermined number of users.

Clause 19: A non-transitory computer-readable medium storing instructions executable by one or more processors to cause the one or more processors to perform steps of a method for algorithmic assignment of role based access control, the method comprising: receiving user profile data for a plurality of users, the user profile data comprising one or more user access control permissions granted to each user of the plurality of users; receiving user activity data associated with each user; generating user access data based on a combination of the user profile data and the user activity data; generating, using a clustering model, a plurality of clusters, each of the plurality of clusters comprising one or more users of the plurality of users, wherein the one or more users within a respective cluster have a first degree of similarity higher than second a degree of similarity between users outside of the respective cluster; identifying a first access control permission common to a predetermined number of users within a first cluster of the plurality of clusters; identifying a first user within the first cluster lacking the first access control permission; calculating a similarity measurement between the user access data of the first user and the predetermined number of users within the first cluster; responsive to the similarity measurement exceeding a first predetermined threshold, automatically granting the first access control permission to the first user; responsive to the similarity measurement exceeding a second predetermined threshold: automatically grant the first access control permission to the first user; and generate and transmit a notification to a role authorizer associated with the first access control permission; and responsive to the similarity measurement exceeding a third predetermined threshold, reducing a number of manual authorizations required before granting the first access control permission to the first user.

Clause 20: The non-transitory computer-readable medium of clause 19, storing additional instructions that, when executed by one or more processors to cause the one or more processors to perform the steps of: generating the plurality of clusters using a k-means clustering model; and determining the first degree of similarity based on minimizing a within-cluster sum of squares.

What is claimed is:

1. A system for algorithmic assignment of role based access control, the system comprising:
   one or more processors; and
   a memory storing instructions, that when executed by the one or more processors, are configured to cause the system to:
   receive user profile data for a plurality of users, the user profile data comprising one or more user access control permissions granted to each user of the plurality of users;
   receive user activity data associated with each user;
   generate user access data based on a combination of the user profile data and the user activity data;
   generate, using a clustering model, a plurality of clusters, each of the plurality of clusters comprising one or more users of the plurality of users, wherein the one or more users within a respective cluster have a first degree of similarity higher than a second degree of similarity between users outside of the respective cluster;
identify a first access control permission common to a predetermined number of users within a first cluster of the plurality of clusters;
identify a first user within the first cluster lacking the first access control permission;
calculate a similarity measurement between the user access data of the first user identified as lacking the first access control permission and the predetermined number of users within the first cluster; and
responsive to the similarity measurement exceeding a first predetermined threshold, automatically grant the first access control permission to the first user.

2. The system of claim 1, wherein the memory stores instructions, that when executed by the one or more processors cause the system to:
responsive to the similarity measurement exceeding a second predetermined threshold, automatically grant the first access control permission to the first user; and
generate and transmit a notification to a role authorizer associated with the first access control permission.

3. The system of claim 1, wherein the memory stores instructions, that when executed by the one or more processors cause the system to:
responsive to the similarity measurement exceeding a third predetermined threshold, reducing a number of manual authorizations required before granting the first access control permission to the first user.

4. The system of claim 1, wherein the memory stores instructions, that when executed by the one or more processors cause the system to:
generate the plurality of clusters using a k-means clustering model; and
determine the first degree of similarity based on minimizing a within-cluster sum of squares.

5. The system of claim 4, wherein the memory stores instructions, that when executed by the one or more processors cause the system to:
iteratively regenerate the plurality of clusters to minimize a validation metric; and
select an optimum number of clusters k based on the minimized validation metric.

6. The system of claim 5, wherein the validation metric is determined by a method selected from a silhouette analysis and an elbow curve analysis.

7. The system of claim 1, wherein the memory stores instructions, that when executed by the one or more processors cause the system to:
generate the plurality of clusters using a density-based spatial clustering of applications with noise clustering model.

8. The system of claim 1, wherein generating user access data comprises generating a plurality of user access data vectors, each of the plurality of user access data vectors based on the combination of user profile data and user activity data.

9. The system of claim 8, wherein generating the plurality of clusters further comprises reducing a dimensionality of the user access data vectors.

10. The system of claim 1, wherein the similarity measurement comprises a cosine similarity between a first user access data vector associated with the first user and an average user access data vector associated with the predetermined number of users.

11. A computer-implemented method for algorithmic assignment of role based access control, the method comprising:
receiving user profile data for a plurality of users, the user profile data comprising one or more user access control permissions granted to each user of the plurality of users;
receiving user activity data associated with each user;
generating user access data based on a combination of the user profile data and the user activity data;
generating, using a k-means clustering model, a plurality of clusters, each of the plurality of clusters comprising one or more users of the plurality of users, wherein the one or more users within a respective cluster have a first degree of similarity higher than a second degree of similarity between users outside of the respective cluster, the first degree of similarity determined based on minimizing a within-cluster sum of squares;
identifying a first access control permission common to a predetermined number of users within a first cluster of the plurality of clusters;
identifying a first user within the first cluster lacking the first access control permission;
calculating a similarity measurement between the user access data of the first user identified as lacking the first access control permission and the predetermined number of users within the first cluster; and
responsive to the similarity measurement exceeding a first predetermined threshold, automatically granting the first access control permission to the first user.

12. The method of claim 11, further comprising:
responsive to the similarity measurement exceeding a third predetermined threshold, reducing a number of manual authorizations required before granting the first access control permission to the first user.

13. The method of claim 11, wherein generating user access data comprises generating a plurality of user access data vectors, each of the plurality of user access data vectors based on the combination of user profile data and user activity data.

14. The method of claim 13, wherein generating the plurality of clusters further comprises reducing a dimensionality of the user access data vectors.

15. The method of claim 11, wherein the similarity measurement comprises a cosine similarity between a first user access data vector associated with the first user and an average user access data vector associated with the predetermined number of users.

16. The system of claim 1, wherein the user profile data further comprises a role of each user within an organization.

17. The system of claim 1, wherein the user activity data comprises browser activity associated with each user, github commits associated with a respective user, or combinations thereof.

18. The system of claim 1, wherein generating user access data comprises generating a user access data vector for each user of the plurality of users, wherein the user access data vector comprises a plurality of binary data entries derived from the user profile data and user activity data associated with a respective user of the plurality of users.

19. A non-transitory computer-readable medium storing instructions executable by one or more processors to cause the one or more processors to perform steps of a method for algorithmic assignment of role based access control, the method comprising:

receiving user profile data for a plurality of users, the user profile data comprising one or more user access control permissions granted to each user of the plurality of users;

receiving user activity data associated with each user;

generating user access data based on a combination of the user profile data and the user activity data;

generating, using a clustering model, a plurality of clusters, each of the plurality of clusters comprising one or more users of the plurality of users, wherein the one or more users within a respective cluster have a first degree of similarity higher than second a degree of similarity between users outside of the respective cluster;

identifying a first access control permission common to a predetermined number of users within a first cluster of the plurality of clusters;

identifying a first user within the first cluster lacking the first access control permission;

calculating a similarity measurement between the user access data of the first user identified as lacking the first access control permission and the predetermined number of users within the first cluster;

responsive to the similarity measurement exceeding a first predetermined threshold, automatically granting the first access control permission to the first user;

responsive to the similarity measurement exceeding a second predetermined threshold:

automatically granting the first access control permission to the first user; and generating and transmitting a notification to a role authorizer associated with the first access control permission; and responsive to the similarity measurement exceeding a third predetermined threshold, reducing a number of manual authorizations required before granting the first access control permission to the first user.

20. The non-transitory computer-readable medium of claim 19, storing additional instructions that, when executed by one or more processors to cause the one or more processors to perform the steps of:

generating the plurality of clusters using a k-means clustering model; and determining the first degree of similarity based on minimizing a within-cluster sum of squares.

* * * * *